5 Sheets—Sheet 1.
C. H. ELLIOTT & R. T. LUCAS.
BEE-HIVE.
No. 178,614. Patented June 13, 1876.
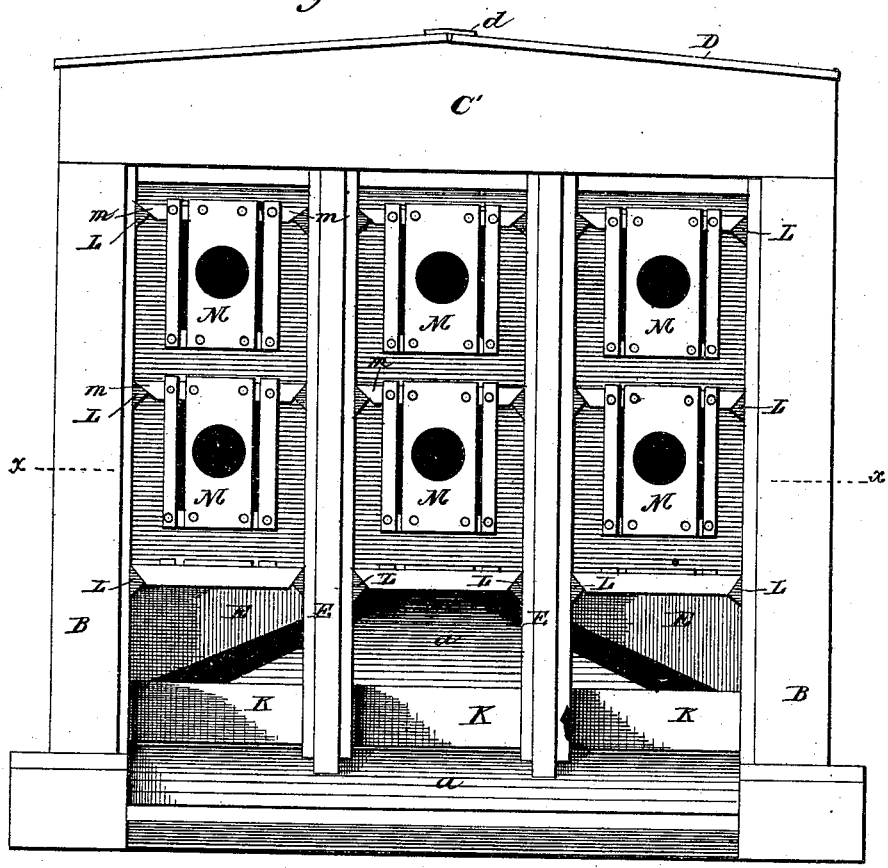
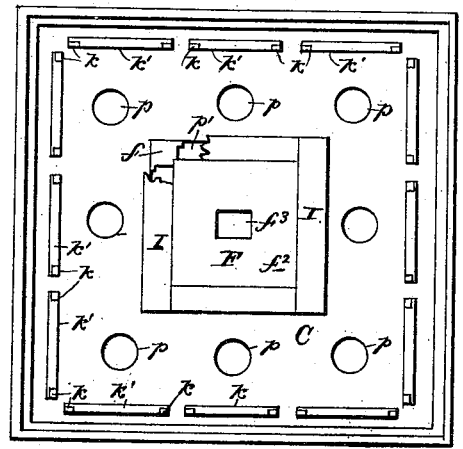
Witnesses;
Harry C. Clark
Mo. C. Stallings.
Inventors
Chas H. Elliott
and
Robt T. Lucas
by H. W. Beadle
Attys.

5 Sheets—Sheet 2.
C. H. ELLIOTT & R. T. LUCAS.
BEE-HIVE.
No. 178,614. Patented June 13, 1876.
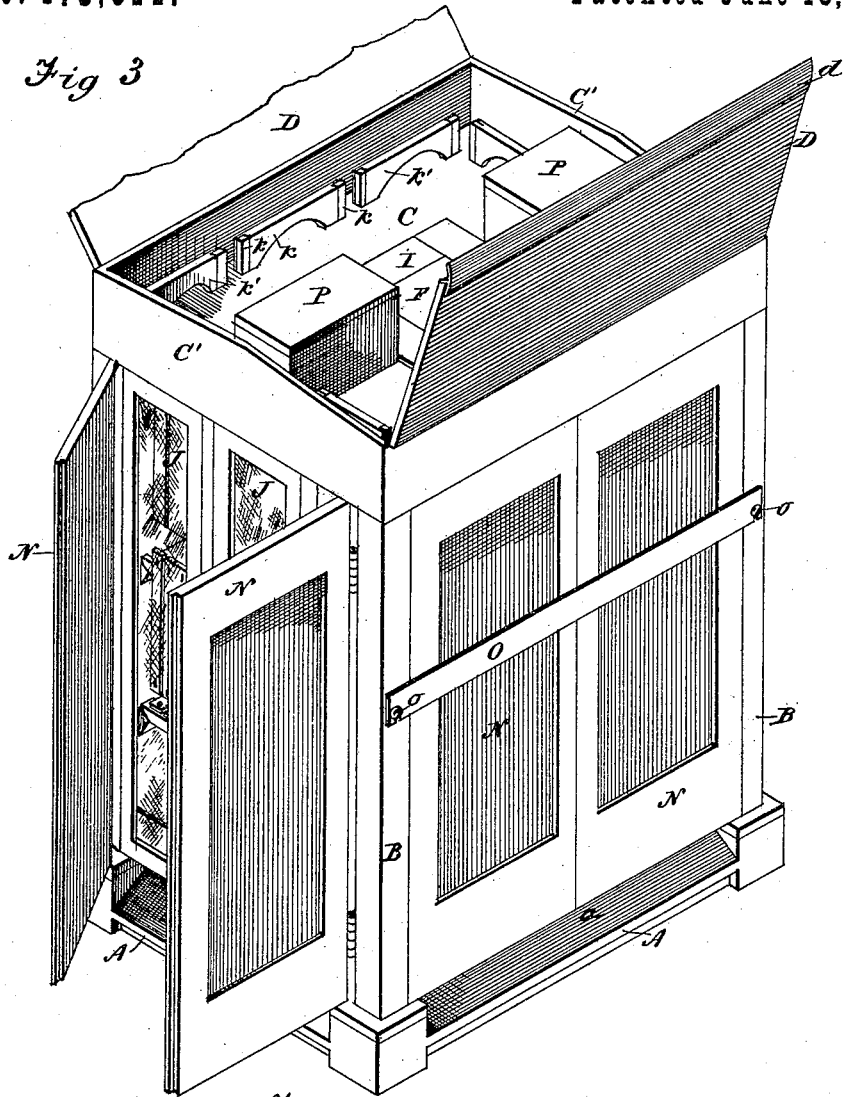
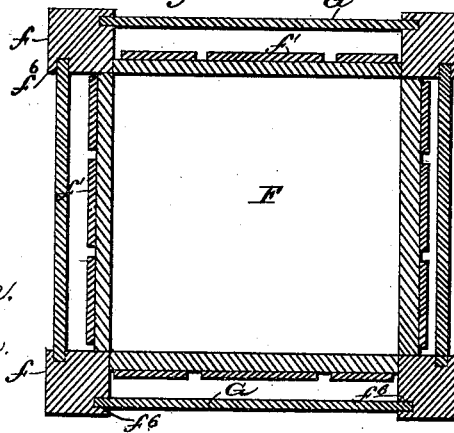
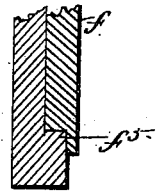
Witnesses:
Harry C. Clark
M. E. Stallings
Inventors.
Chas H. Elliott
and
Rob't T. Lucas.
by H. W. Beadle & Co.
Att'ys.

C. H. ELLIOTT & R. T. LUCAS.
BEE-HIVE.

No. 178,614. Patented June 13, 1876.

Witnesses
Harry C. Clark.
No. C. Stallings

Inventors
Cha's H. Elliott.
and
Rob't T. Lucas.
by H. W. Beadle & Co
Atty's.

5 Sheets—Sheet 4.

C. H. ELLIOTT & R. T. LUCAS.
BEE-HIVE.

No. 178,614. Patented June 13, 1876.

Witnesses;
Harry C Clark
M. E. Stallings

Inventors.
Cha's H. Elliott
and
Rob't T. Lucas
by H. W. Beadle &c
Att'ys.

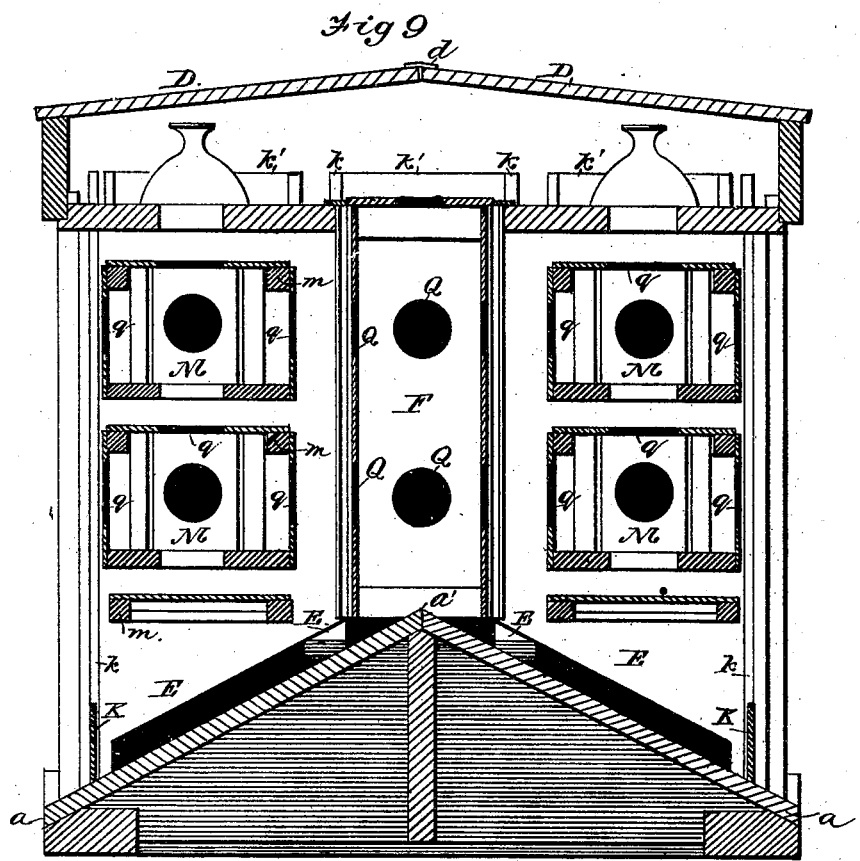

UNITED STATES PATENT OFFICE.

CHARLES H. ELLIOTT AND ROBERT T. LUCAS, OF ALEXANDRIA, VIRGINIA.

IMPROVEMENT IN BEE-HIVES.

Specification forming part of Letters Patent No. 178,614, dated June 13, 1876; application filed May 8, 1876.

*To all whom it may concern:*

Be it known that we, CHAS. H. ELLIOTT and ROBERT T. LUCAS, both of Alexandria, in the county of Alexandria and State of Virginia, have invented a new and useful Improvement in Bee-Hives; and we do hereby declare that the following is a full and exact description of the same, reference being had to the accompanying drawings, and to the letters of reference marked thereon.

This invention consists, mainly, first, in the combination of a central brood-chamber and surrounding surplus-honey chambers with a single pyramidal floor, common to all the hive; second, in the combination of a vertically-removable central brood-chamber with a fixed series of inclosing surplus-honey chambers; third, in the combination, with the removable brood-chamber, of certain removable slides; fourth, in the employment, in connection with surplus-honey chambers, of knives of peculiar construction, for controlling the entrance-openings. It consists, further, in certain details of construction, which, in connection with the foregoing, will be fully described hereinafter.

Figure 5:
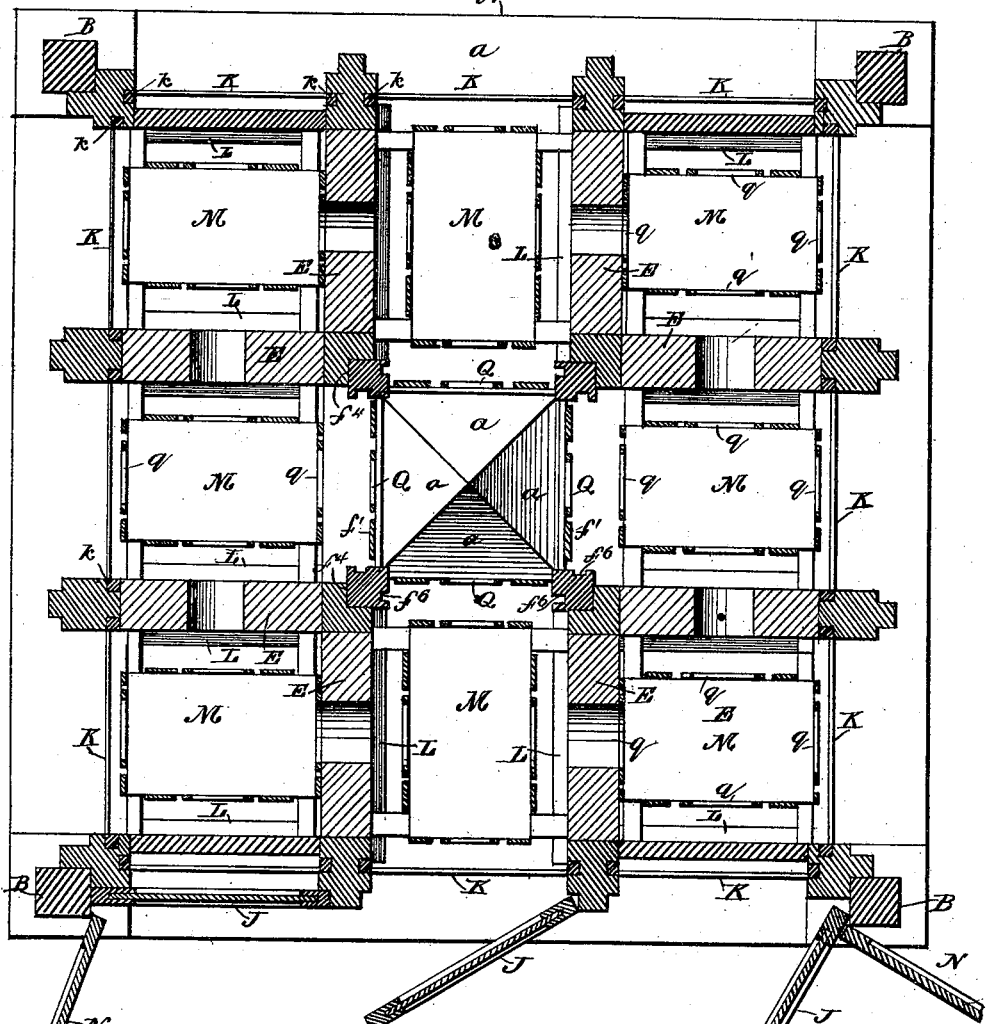
Figure 6:
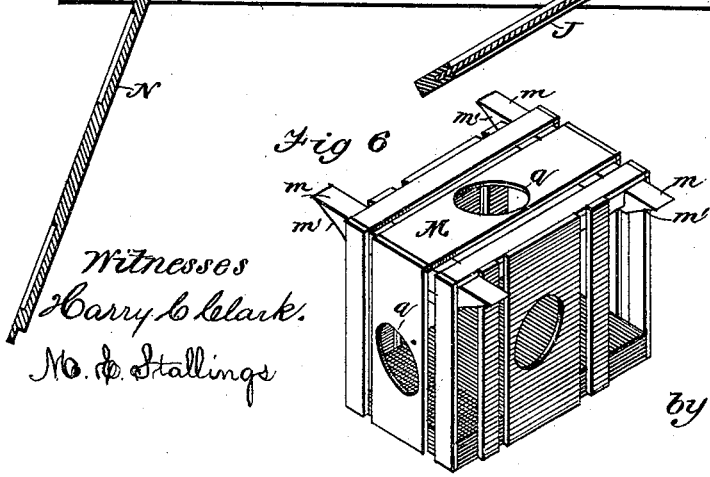
Figure 7:
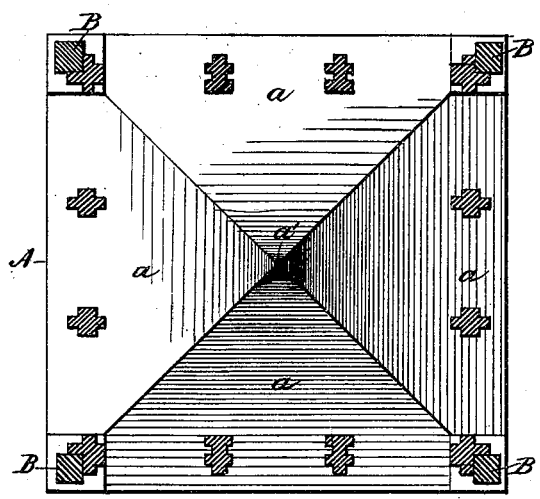
Figure 8:
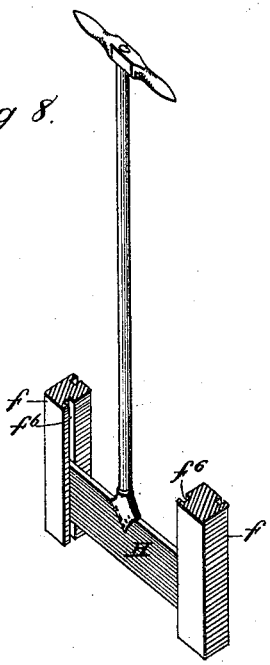

In the drawings, Figure 1 represents a front elevation of our improved hive with the doors removed; Fig. 2, a plan view of the upper floor of the hive with the roof-boards removed; Fig. 3, a perspective view of the hive; Fig. 4, a transverse section of the brood-chamber and its removable slides; Fig. 5, a transverse section of the hive on the line $x\ x$, Fig. 1; Fig. 6, a perspective view of one of the honey-drawers removed; Fig. 7, a plan view of the pyramidal floor; Fig. 8, a perspective view of the comb-knife, and Fig. 9 a central vertical sectional elevation.

To enable others skilled in the art to make and use our invention, we will now proceed to describe fully its construction and manner of operation.

A represents the bottom board of the hive, consisting of equal sides $a\ a\ a\ a$, rising at a proper incline from a common square, as a base to a central apex, $a'$, thus forming a quadrangular pyramid, as shown in Fig. 7. B B represent corner-posts, secured to the base in any proper manner, which extend upward to form the frame and support the upper parts.

C, Figs. 2 and 3, represents the top board, supported by the corner-posts B B; C' C', the cornice-boards or walls forming the upper division of the hive, and D D the roof-boards, provided with a metal ridge-piece, $d$, adapted to prevent the entrance of rain, as shown. E E, Fig. 5, represent partitions or division-boards, two of which are arranged at right angles to each other, in each corner of the hive, so that the interior surface is subdivided into nine equal parts, one of which, being centrally located, is surrounded by the others, as shown. These partitions are connected above to the roof-board in any suitable manner, but below rest upon the base-board at one point only, an intermediate space being left, excepting at the front edge, as shown in Fig. 9.

F represents the central brood-chamber, consisting of a box preferably constructed with grooved corner-posts $f$, slatted sides $f^1$, and closed top $f^2$, having a central opening, $f^3$, as shown. This is adapted to slide freely in a vertical direction in proper guiding-grooves $f^4$, formed in the inner angles of the partition-boards, as shown, but is prevented by proper stop-blocks, $f^5$, Fig. 4, from descending far enough to rest upon the pyramidal base below. G G, Fig. 4, represent slides, which may be placed in the grooves $f^6$ of the corner-posts, for the purpose of making the chamber close when it is removed for the purpose of stocking the hive. H, Fig. 8, represents a knife adapted to slide in these same grooves, which may be used when it is desired to separate the surplus-honey from the brood chamber. I I, Fig. 2, represent covering-boards, which are employed to close the openings left when the slides G are removed, so that the bees may be prevented from passing into the upper division of the hive. J J represent doors, preferably of glass, by means of which the fronts of the surplus-honey chambers are closed, with the exception of a small entrance opening at the bottom. K K represent knives, one of which is employed for each surplus-honey chamber, it being adapted, by means of proper grooves and attached connecting-rods or bars $k\ k$, extending through the top board of the hive, and united by a connecting cross-bar, $k'$, to slide vertically, for the purpose of adjusting or closing the entrance-opening; and also for cutting the comb, if any should be affixed to the inner door, as may be desired. L L represent suitable strips, preferably of triangular form, which are attached to the sides of the surplus-honey chambers, as shown. M M represent the honey-drawers, constructed generally in any proper manner, but provided, essentially, with supporting cross-bars $m\ m$, having the inclined bearing-surfaces $m'$, as shown. These drawers are preferably arranged in pairs in each chamber, one above the other, as shown in Fig. 1; but, if desired, comb-frames of the well-known or other proper construction may be substituted for one or both. An open space of about five-sixteenths of an inch is left all about these drawers, so that the bees have free access on all sides. They are also made open at the corners, as shown, so that a knife may be inserted from either side for the purpose of cutting the comb, and so also that the moth may have no opportunity to find a resting-place. N N represent the exterior door of wood, a pair being adapted to close the three divisions of each side, as shown. An entrance-opening is left below the lower edges of these, similar to that of the inner doors before referred to.

O O represent fastening-bars adapted to hold these doors in place, which are provided at their ends with hooks or slots, adapted to be caught over the studs or buttons $o\ o$. $p\ p$, Fig. 2, represent openings in the top board of the hive, communicating with each of the surplus-honey chambers; and $p'$, a large central opening, adapted to permit the insertion and removal of the brood-chamber. P P represent honey-boxes or glass vessels, adapted to be placed over the openings $p\ p$, as shown. Q represents openings from the brood-chamber into the surplus-honey chambers, and $q$ similar openings in the partitions and honey-drawers, the construction being such that access from the brood-chambers is had to all the drawers and boxes.

The manner of using our improved hive will be readily understood. When it is desired to stock the hive the brood-chamber is removed and the slides inserted for the purpose of closing its sides, its top opening also being closed by any suitable cover. The bees may then be driven into it in any proper manner, and the same be replaced in its proper position in the hive. By simply removing the slides the bees will have access to the honey-drawers. By judiciously using the knives the bees may be caused to work in any desired part of the box, it being understood that they will work from the top down toward their entrance-opening. By removing the top drawer when filled, and substituting therefor the lower one, which is partly filled, this latter being replaced by a fresh drawer, the best results can be obtained.

Some of the advantages of the described construction are as follows: The hive is readily kept clean, as there are no horizontal surfaces upon which the dirt can lodge, anything falling upon the inclined surface below, of course, being readily discharged from the hive.

The inclined supporting-strips hold the supporting-bars of the honey-drawers properly, and also discharge any dirt that may fall upon them by means of the incline; also, a right angle, which is favorable to the deposition of moth-eggs, is avoided. The hive also is practically moth-proof, it being free from cracks or crevices of any kind, and having its entrance-openings well guarded by the knives. The hive also is adapted to prevent the swarming of the bees, for the reason that so much room is afforded in separate and distinct divisions.

The honey may be readily removed by using the sliding knife to separate the drawer from the comb of the brood-chamber.

Having thus fully described our invention, what we claim as new, and desire to secure by Letters Patent, is—

1. The combination of a central brood-chamber and surrounding surplus-honey chambers with a single pyramidal floor, substantially as described.

2. The combination of a central removable brood-hive with a series of fixed inclosing honey-chambers, located upon every side of the brood-chamber, as described.

3. The adjustable knives K, adapted to regulate the entrance-opening, and also to slide the entire length of the door, as described.

4. The combination, with the removable brood-chamber, of the removable slides, as described.

5. In combination with a pyramidal floor, the brood-chamber and surplus-honey chambers, located directly over the floor, as described.

6. The combination of the inclined supporting-strip with the corresponding supporting-bars of the honey-drawers.

This specification signed and witnessed this 2d day of May, 1876.

CHARLES H. ELLIOTT.
    R. T. LUCAS.

Witnesses:
 W. H. UNDERWOOD,
 HARRY C. CLARK.